United States Patent [19]

Nichoalds

[11] Patent Number: 4,786,122
[45] Date of Patent: Nov. 22, 1988

[54] CABINET CONSTRUCTION

[75] Inventor: Donald L. Nichoalds, Libertyville, Ill.

[73] Assignee: Luxor Corporation, Waukegan, Ill.

[21] Appl. No.: 924,982

[22] Filed: Oct. 30, 1986

[51] Int. Cl.$^4$ ............................................. A47B 43/00
[52] U.S. Cl. ............................ 312/257 SK; 312/250; 312/257 R
[58] Field of Search ........ 312/257 SM, 257 A, 257 R, 312/264, 263

[56] References Cited

U.S. PATENT DOCUMENTS

| 2,999,730 | 9/1961 | Troutman | 312/257 SK |
| 4,045,104 | 8/1977 | Peterson | 312/263 X |

FOREIGN PATENT DOCUMENTS

| 558462 | 6/1958 | Canada | 312/257 SK |
| 1150069 | 1/1958 | France | 312/357 SK |
| 820702 | 9/1959 | United Kingdom | 312/257 R |

Primary Examiner—Kenneth J. Dorner
Assistant Examiner—Gerald A. Anderson
Attorney, Agent, or Firm—Wood, Dalton, Phillips, Mason & Rowe

[57] ABSTRACT

A cabinet construction and method of forming the same having a plurality of sidewall panels, each of which defines opposite vertical edges, and an intermediate wall portion. Cylindrical upright corner posts are secured between top and bottom walls of the cabinet. The sidewall panels include angularly returned flanges on the edges thereof defining acute angles. The flanges are wedged against the outer surfaces of the corner posts to prevent inward movement of the panels and structure is provided in association with the top and bottom walls of the cabinet for retaining the cabinet against outward displacement.

13 Claims, 1 Drawing Sheet

CABINET CONSTRUCTION

BACKGROUND OF THE INVENTION

1. Field of the Invention

This invention relates to cabinet constructions and in particular to mobile cabinets, such as for use as audiovisual/utility mobile cabinet tables.

2. Description of the Background Art

In one improved form of audiovisual/utility cabinet table marketed by the assignee hereof, a wheeled cabinet is provided with a front locking door. Two of the casters are provided with brakes, permitting the cabinet to be readily transported with the brakes released and locked against further movement when disposed in the desired location.

The cabinet includes a top wall on which audiovisual and other equipment may be placed, and a bottom wall to which the casters are secured.

The present invention comprehends an improved form of such a cabinet which is readily and economically manufactured while providing a strong, sturdy cabinet table suitable for a wide range of uses.

SUMMARY OF THE INVENTION

The present invention comprehends the provision of such an improved cabinet construction having a plurality of sidewall panels, each of which defines opposite vertical edges, and an intermediate wall portion. The invention comprehends the provision in such a cabinet of cylindrical upright corner posts, angularly returned flanges on the edges of the sidewall panels defining acute angles with the wall portions thereof, means for securing the panels in a space-enclosing array with the flanges abutting the cylindrical corner posts, each flange abutting the associated post outwardly of a radius of the post extending parallel to the wall portion of the panel whereby the edges are prevented from moving inwardly by the engagement of the flanges with the posts, and means for preventing outward movement of the sidewall panels.

In the illustrated embodiment, the cabinet construction includes a bottom wall and a top wall. Means are provided on the top and bottom walls for securing the corner posts therebetween and retaining means are provided on at least one of the bottom wall and top wall for preventing outward movement of the sidewall panels in the assembled cabinet construction.

In the illustrated embodiment, the flanges extend at an angle of approximately 45° to the sideall portions.

In the disclosed embodiment, the corner posts are right-circularly cylindrical.

In the illustrated embodiment, the cabinet construction defines a parallelepiped enclosed space and the posts comprise four corner posts thereof.

The invention further comprehends the novel method of retaining cabinet panels in a cabinet construction, including the steps of providing return angled flanges on the edges of the panels and wedging the flanges against upright supports in the cabinet construction.

The improved method of retaining cabinet panels comprehens further that the panels include edges free of the return angled flanges and the step of retaining the further edges against outward displacement to maintain the angled flanges wedged against the upright supports.

In the illustrated embodiment, the retaining means further comprises means for retaining the top and bottom walls against outward displacement.

The cabinet construction of the present invention is extremely simple and economical while yet providing the highly desirable features discussed above.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
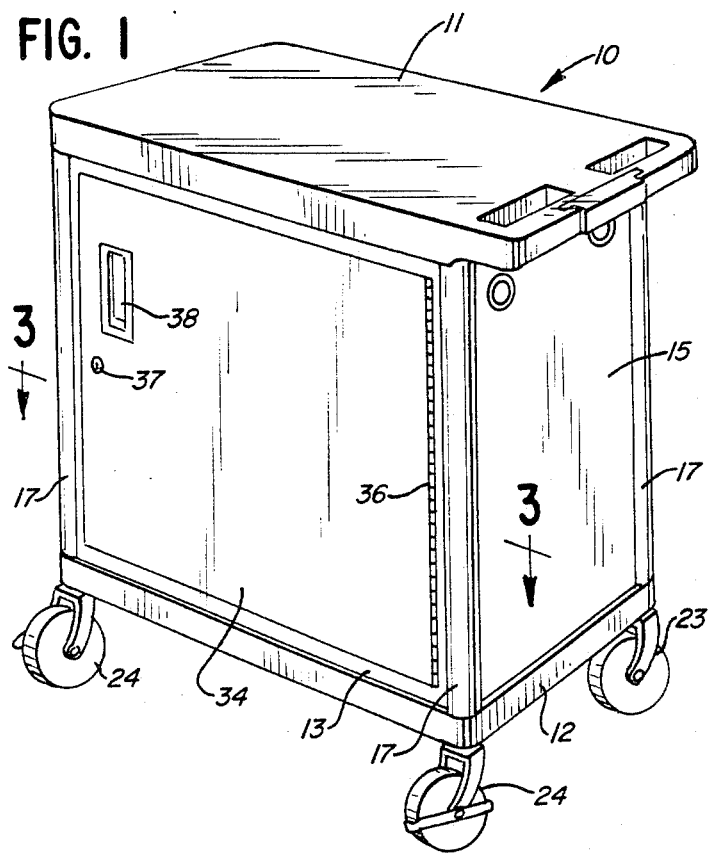
FIG. 1 is a perspective view of a cabinet construction embodying the invention.

In the illustrative embodiment of the invention as disclosed in the drawing, a cabinet construction generally designated 10 is shown to comprise a generally parallelepiped cabinet construction having a top wall 11, a bottom wall 12, a front wall 13, a rear all 14, a right sidewall 15, and a left sidewall 16.

The cabinet construction further includes a plurality of upright posts 17. In the illustrated embodiment, the posts comprise right-circularly cylindrical tubular posts having hollow opposite ends 18 and 19 fitted to depending cylindrical connectors 20 formed integrally with top wall 11, and connectors 21 formed integrally with bottom wall 12.

As further shown in the drawing, the bottom wall is provided with openings 22 to which are swingably mounted conventional casters 23 and braking casters 24.

Figure 2:
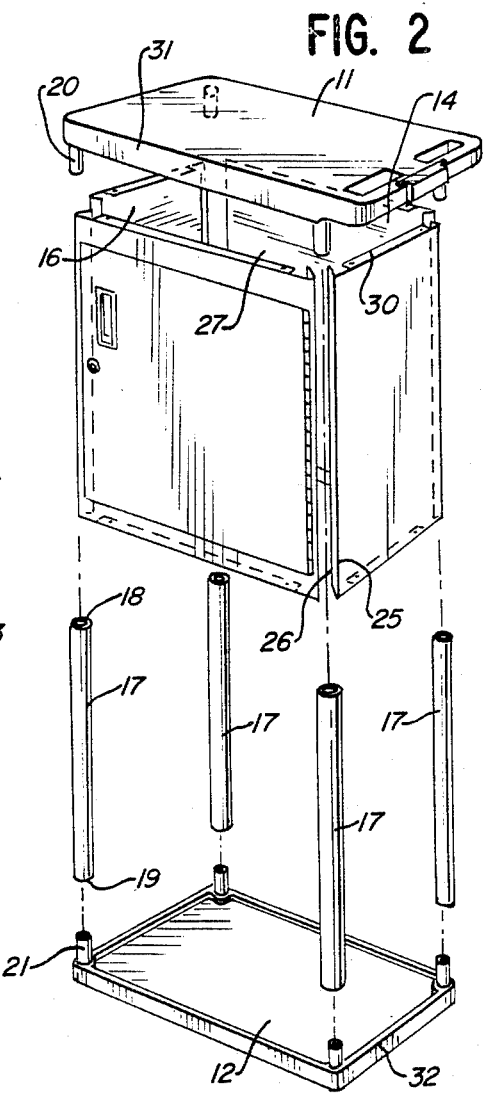
FIG. 2 is an exploded perspective view of a portion of the cabinet construction illustrating the method of assembly thereof in greater detail.
Figure 3:
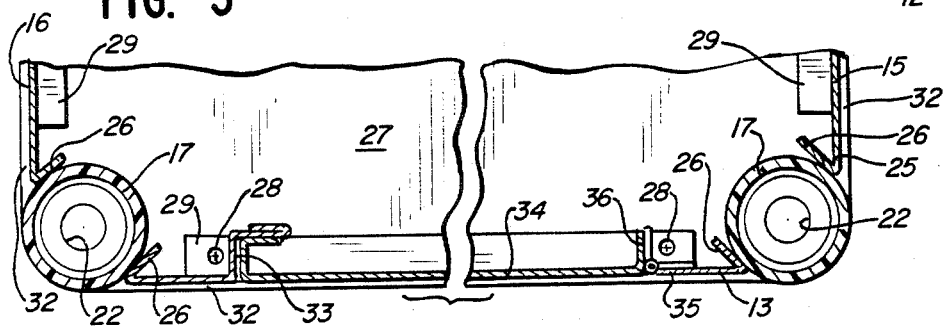
FIG. 3 is a fragmentary enlarged horizontal section taken substantially along the line 3—3 of FIG. 1.
Figure 4:
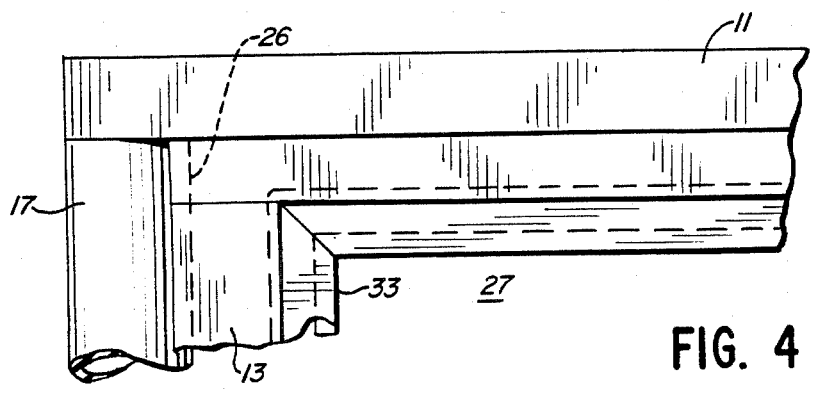
FIG. 4 is a fragmentary front elevation illustrating in greater detail the front corner construction of the cabinet.

The invention comprehends an improved means for mounting the upright front wall panel 13, rear wall panel 14, and sidewall panels 15 and 16 in the cabinet construction 10. As illustrated in FIGS. 2 and 3, the vertical side edges 25 of the respective panels are provided with return angled flanges 26. As shown in FIG. 3, the flanges 26 are wedged against the cylindrical outer surface of the corner posts 17 so as to retain the panels against inward displacement relative to the four corners of the parallelepiped cabinet construction.

The panels are retained against outward displacement away from the enclosed cabinet space 27 by suitable securing means. In the illustrated embodiment, the securing means includes threaded securing elements 28 extending through an inturned bottom flange 29 on each of the front and rear panels and threaded into the bottom wall 12. The upper edge of the front and rear panels is defined by an inturned flange 30 which is secured to the top wall 11 by suitable threaded securing means, such as screws 28.

Additionally, the top wall 11 is provided with a depending peripheral flange 31 and the bottom wall is provided with an upstanding peripheral flange 32 defining shoulder means for preventing outward displacement of each of the panels away from space 27.

The angled flanges 26 are wedged between the top wall flange 31 and the corner post 17 and between the bottom wall flange 32 and the corner post 17 to further serve as means for retaining the cabinet in the assembled disposition.

Front wall 13 defines a recessed opening 33. A conventional door 34 is hinged to one edge portion 35 of the panel by a suitable conventional hinge 36. As shown in FIG. 1, the door may be provided with suitable lock means 37 for locking the door in the closed disposition when desired. A recessed handle 38 may be provided in the door for facilitated manipulation of the door as desired.

Thus, in broad aspect, the improved cabinet construction of the present invention includes cylindrical upright corner posts, a bottom wall, a top wall, angularly returned flanges on the edges of the sidewall panels defining acute angles with the wall portion thereof. Means are provided for retaining the panels in a space-enclosing array, with the flanges abutting the cylindrical corner posts. Each of the flanges abuts the associated posts outwardly of a radius of the post extending parallel to the wall portion of the panel, whereby the edges are prevented from moving inwardly by the engagement of the flanges with the post. Means are provided on the top and bottom walls for securing the corner posts therebetween and retaining means are provided on at least one of the bottom wall and top wall for preventing outward movement of the sidewall panels.

In the illustrated embodiment, the means on the top and bottom walls for securing the corner posts further serve as retaining means for preventing the outward movement of the sidewall panels. Each of the right and left sidewalls and the front and rear sidewalls is similarly constructed in this manner to provide, in the illustrated embodiment, a unique parallelepiped cabinet construction which is extremely simple and economical while yet providing a positive, strong cabinet arrangement.

The foregoing disclosure of specific embodiments is illustrative of the broad inventive concept comprehended by the invention.

I claim:

1. In a cabinet construction having top and bottom walls, a plurality of upright panels each of which defines opposite vertical side edges, top and bottom edges, and an intermediate wall portion, the improvement comprising:
    cylindrical upright corner posts captured between said top and bottom walls; and
    means for securing said panels in a space-enclosing array comprising angularly returned flanges on said edges of said panels defining acute angles with said intermediate wall portions thereof, each flange abutting an associated post only outwardly of a radius of the post extending parallel to the wall portion of the panel whereby the panels are prevented from moving inwardly by the engagement of said flanges with said posts, and flanges on said top and bottom walls outwardly of and engaged by said top and bottom edges of said panels respectively for preventing outward movement of said panels.

2. The cabinet construction of claim 1 further including end walls and means for releasably securing the end walls to the panels.

3. The cabinet construction of claim 1 wherein said flanges extend at an angle of approximately 45° to said intermediate wall portions.

4. The cabinet construction of claim 1 wherein said cabinet construction defines a parallelepiped, enclosed space and said posts comprise four corner posts.

5. The cabinet construction of claim 1 wherein said posts are right circularly cylindrical.

6. The method of retaining flat cabinet panels in a cabinet construction comprising the steps of:
    providing cylindrical posts;
    providing returned angle flanges on opposite edges of the panels;
    providing top and bottom walls capturing the ends of said posts providing a flange along the edges of said top and bottom walls; and
    wedging said panel flanges between said posts and said top and bottom wall flanges, said posts defining outer portions outwardly of a radius of the posts extending parallel to the flatwise extent of the panels between said edges, and said panel flanges engaging only said outer portions of said posts.

7. The method of retaining cabinet panels in a cabinet construction of claim 6 further including the step of securing portions of the panels in association with said fixed walls.

8. The method of retaining cabinet panels in a cabinet construction of claim 6 further including the step of securing portions of the panels in association with said fixed walls with threaded securing means.

9. In a cabinet construction having a plurality of upright flat panels each of which defines opposite vertical side edges and an intermediate wall portion, the improvement comprising:
    a bottom wall;
    a top wall;
    cylindrical upright corner posts extending vertically between and engaging said bottom and top walls in a preselected spaced arary;
    substantially planar angularly returned flanges on said side edges of said panels defining acute angles with said intermediate portions thereof;
    means for securing said panels in a space-enclosing array with said flanges abutting the cylindrical corner posts, each flange abutting the associated post outwardly of a radius of the post extending parallel to the flat extent of the panel whereby the side edges are prevented from moving inwardly by the engagement of said flanges with said posts;
    means on said top and bottom walls for retaining the corner posts therebetween; and
    flanges on said bottom wall and top wall engaging the panels for preventing outward movement of said upright panels adjacent said bottom and top walls.

10. The cabinet construction of claim 9 wherein said retaining means further comprises threaded means for securing said top and bottom walls to said panels.

11. The cabinet construction of claim 10 wherein said retaining means comprises threaded securing means.

12. The cabinet construction of claim 9 wherein said posts are right circularly cylindrical and said flanges extend at an angle of approximately 45° to said flat extent of the panels.

13. The cabinet construction of claim 9 wherein said cabinet construction defines a parallelepiped enclosed space and said posts comprise four corner posts.

* * * * *